US012412510B2

(12) United States Patent
Kim et al.

(10) Patent No.: US 12,412,510 B2
(45) Date of Patent: Sep. 9, 2025

(54) DISPLAY APPARATUS

(71) Applicant: Samsung Display Co., LTD., Yongin-si (KR)

(72) Inventors: Yoosung Kim, Yongin-si (KR); Hyunho Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 32 days.

(21) Appl. No.: 18/388,835

(22) Filed: Nov. 11, 2023

(65) Prior Publication Data

US 2024/0282244 A1 Aug. 22, 2024

(30) Foreign Application Priority Data

Feb. 16, 2023 (KR) ........................ 10-2023-0020904

(51) Int. Cl.
*G09G 3/20* (2006.01)
*G09G 3/32* (2016.01)

(52) U.S. Cl.
CPC ......... *G09G 3/32* (2013.01); *G09G 2310/027* (2013.01); *G09G 2320/0276* (2013.01); *G09G 2330/021* (2013.01)

(58) Field of Classification Search
CPC ............... G09G 3/32; G09G 2310/027; G09G 2320/0276; G09G 2330/021
USPC ........................................................... 345/55
See application file for complete search history.

(56) References Cited

U.S. PATENT DOCUMENTS

2015/0325200 A1* 11/2015 Rho ..................... G09G 3/3688 345/212
2020/0234624 A1* 7/2020 Lim ......................... G09G 3/20
2021/0118348 A1* 4/2021 Park ..................... G09G 3/3696

FOREIGN PATENT DOCUMENTS

| | | | |
|---|---|---|---|
| KR | 101876335 | B1 | 7/2018 |
| KR | 1020200108226 | A | 9/2020 |
| KR | 102232175 | B1 | 3/2021 |
| KR | 102250844 | B1 | 5/2021 |

* cited by examiner

*Primary Examiner* — Jennifer T Nguyen
(74) *Attorney, Agent, or Firm* — CANTOR COLBURN LLP

(57) ABSTRACT

A display apparatus includes: a gamma reference voltage generator, a digital-to-analog converter, an amplifier and a bias voltage applier. The gamma reference voltage generator is configured to generate a gamma reference voltage. The digital-to-analog converter is configured to convert a data signal to a data voltage based on the gamma reference voltage. The amplifier is configured to receive the data voltage from the digital-to-analog converter and to output the data voltage to a data line. The bias voltage applier is configured to output a first bias voltage to the gamma reference voltage generator and to output a second bias voltage to the amplifier. The bias voltage applier is turned off while input image data have a black image.

20 Claims, 17 Drawing Sheets

DISPLAY APPARATUS

This application claims priority to Korean Patent Application No. 10-2023-0020904, filed on Feb. 16, 2023, and all the benefits accruing therefrom under 35 U.S.C. § 119, the content of which in its entirety is herein incorporated by reference.

BACKGROUND

1. Field

Embodiments of the present invention relate to a display apparatus. More particularly, embodiments of the present invention relate to a display apparatus reducing a power consumption of a data driver.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver and a data driver. The gate driver outputs gate signals to the gate lines. The data driver outputs data voltages to the data lines. The display panel driver may further include a gamma reference voltage generator providing a gamma reference voltage to the data driver.

High constant current may flow through amplifiers of the gamma reference voltage generator and the data driver so that a power consumption of the display apparatus may be high.

SUMMARY

Embodiments of the present invention provide a display apparatus capable of reducing a power consumption of the display apparatus by operating a gamma reference voltage generator and a data driver in a black mode when a display panel displays a black image.

In an embodiment of a display apparatus according to the present invention, the display apparatus includes: a gamma reference voltage generator, a digital-to-analog converter, an amplifier and a bias voltage applier. The gamma reference voltage generator is configured to generate a gamma reference voltage. The digital-to-analog converter is configured to convert a data signal to a data voltage based on the gamma reference voltage. The amplifier is configured to receive the data voltage from the digital-to-analog converter and to output the data voltage to a data line. The bias voltage applier is configured to output a first bias voltage to the gamma reference voltage generator and to output a second bias voltage to the amplifier. The bias voltage applier is turned off while input image data have a black image.

In an embodiment, the gamma reference voltage generator and the amplifier may be turned off while the input image data have the black image.

In an embodiment, the display apparatus may further include: a channel connected to the data line, a first switch connected between an output terminal of the amplifier and the channel and a second switch connected between an input terminal of a hold voltage and the channel.

In an embodiment, in a normal mode in which the input image data include a grayscale value which is not the black image, the first switch may be turned on and the second switch may be turned off.

In an embodiment, in a black mode in which the input image data include only the black image, the first switch may be turned off and the second switch may be turned on.

In an embodiment, the hold voltage may be a high data power voltage generated by a power voltage generator.

In an embodiment of a display apparatus according to the present invention, the display apparatus includes: a display panel, a channel, an amplifier, a first switch and a second switch. The display panel includes a data line extending in a second direction. The channel is connected to the data line. The amplifier is configured to output a data voltage. The first switch is connected between an output terminal of the amplifier and the channel. The second switch is connected between an input terminal of a hold voltage and the channel. When input image data have a first black pattern extending in a first direction perpendicular to the second direction, the first switch is turned off and the second switch is turned on during a black period corresponding to the first black pattern, and the first switch is turned on and the second switch is turned off during a normal period not corresponding to the first black pattern.

In an embodiment, a data signal may include a line configuration and line data. The line configuration may include a setting signal representing the black period and the normal period.

In an embodiment, when proceeding from the black period to the normal period, the setting signal may be determined based on a wakeup time.

In an embodiment, the display apparatus may further include a gamma reference voltage generator configured to generate a gamma reference voltage, a digital-to-analog converter configured to convert a data signal to the data voltage based on the gamma reference voltage and a bias voltage applier configured to output a first bias voltage to the gamma reference voltage generator and to output a second bias voltage to the amplifier.

In an embodiment, the bias voltage applier may be turned off during the black period.

In an embodiment, the gamma reference voltage generator and the amplifier may be turned off during the black period.

In an embodiment of a display apparatus according to the present invention, the display apparatus includes: a display panel, a first channel, a first amplifier, A-1 switch, B-1 switch, a second channel, a second amplifier, A-2 switch and B-2 switch. The display panel includes a first display block and a second display block which extend in an extension direction of a data line, where the data line includes a first data line and a second data line. The first channel is connected to the first data line of the first display block. The first amplifier is configured to output a first data voltage to the first channel. The A-1 switch is connected between an output terminal of the first amplifier and the first channel. The B-1 switch is connected between an input terminal of a hold voltage and the first channel. The second channel is connected to the second data line of the second display block. The second amplifier is configured to output a second data voltage to the second channel. The A-2 switch is connected between an output terminal of the second amplifier and the second channel. The B-2 switch is connected between an input terminal of the hold voltage and the second channel. The A-1 switch and the B-1 switch are controlled independently from the A-2 switch and the B-2 switch.

In an embodiment, when the data line extends in a second direction, input image data have a second black pattern extending in the second direction and the second black pattern overlaps an entirety of the first display block, the A-1 switch may be turned off and the B-1 switch may be turned on.

In an embodiment, when the data line extends in a second direction, input image data have a second black pattern extending in the second direction and the second black pattern partially overlaps the first display block or does not overlap the first display block, the A-1 switch may be turned on and the B-1 switch may be turned off.

In an embodiment, when the data line extends in a second direction, input image data have a second black pattern extending in the second direction, the second black pattern overlaps an entirety of the first display block and the second black pattern partially overlaps the second display block or does not overlap the second display block, the A-1 switch may be turned off, the B-1 switch may be turned on, the A-2 switch may be turned on and the B-2 switch may be turned off.

In an embodiment, when the data line extends in a second direction, input image data have a third black pattern extending in a first direction perpendicular to the second direction in the first display block, the A-1 switch may be turned off and the B-1 switch may be turned on during a black period corresponding to the third black pattern and the A-1 switch may be turned on and the B-1 switch may be turned off during a normal period not corresponding to the third black pattern.

In an embodiment, a data signal may include a line configuration and line data. The line configuration may include a first display block setting signal representing the black period of the first display block and the normal period of the first display block and a second display block setting signal representing the black period of the second display block and the normal period of the second display block.

In an embodiment, the display apparatus may further include a gamma reference voltage generator configured to generate a gamma reference voltage, a digital-to-analog converter configured to convert a data signal to a data voltage based on the gamma reference voltage and a bias voltage applier configured to output a first bias voltage to the gamma reference voltage generator and to output a second bias voltage to the first amplifier and the second amplifier, where the data voltage includes the first data voltage and the second data voltage.

In an embodiment, while input image data have a black image for all display blocks in the display panel, the bias voltage applier may be turned off.

According to the display apparatus, when the display panel displays the black image, the bias voltage applier of the data driver may be turned off so that the constant current of the data driver may be reduced, and accordingly the power consumption of the display apparatus may be effectively reduced.

When the display panel displays a horizontal black pattern extending in the first direction, for a time corresponding to the horizontal black pattern, the outputs of the amplifiers may be blocked and the output of the data driver may be connected to a predetermined hold voltage so that the constant current of the data driver may be reduced, and accordingly the power consumption of the display apparatus may be effectively reduced.

When the display panel displays a vertical black pattern extending in the second direction, the outputs of the amplifiers corresponding to the vertical black pattern may be blocked and the output of the area of the data driver corresponding to the vertical black pattern may be connected to the predetermined hold voltage so that the constant current of the data driver may be reduced, and accordingly the power consumption of the display apparatus may be effectively reduced.

When the display block of the display panel displays a horizontal black pattern extending in the first direction, for a time corresponding to the horizontal black pattern, the outputs of the amplifiers corresponding to the display block may be blocked and the output of the data driver corresponding to the display block may be connected to the predetermined hold voltage so that the constant current of the data driver may be reduced, and accordingly the power consumption of the display apparatus may be effectively reduced.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
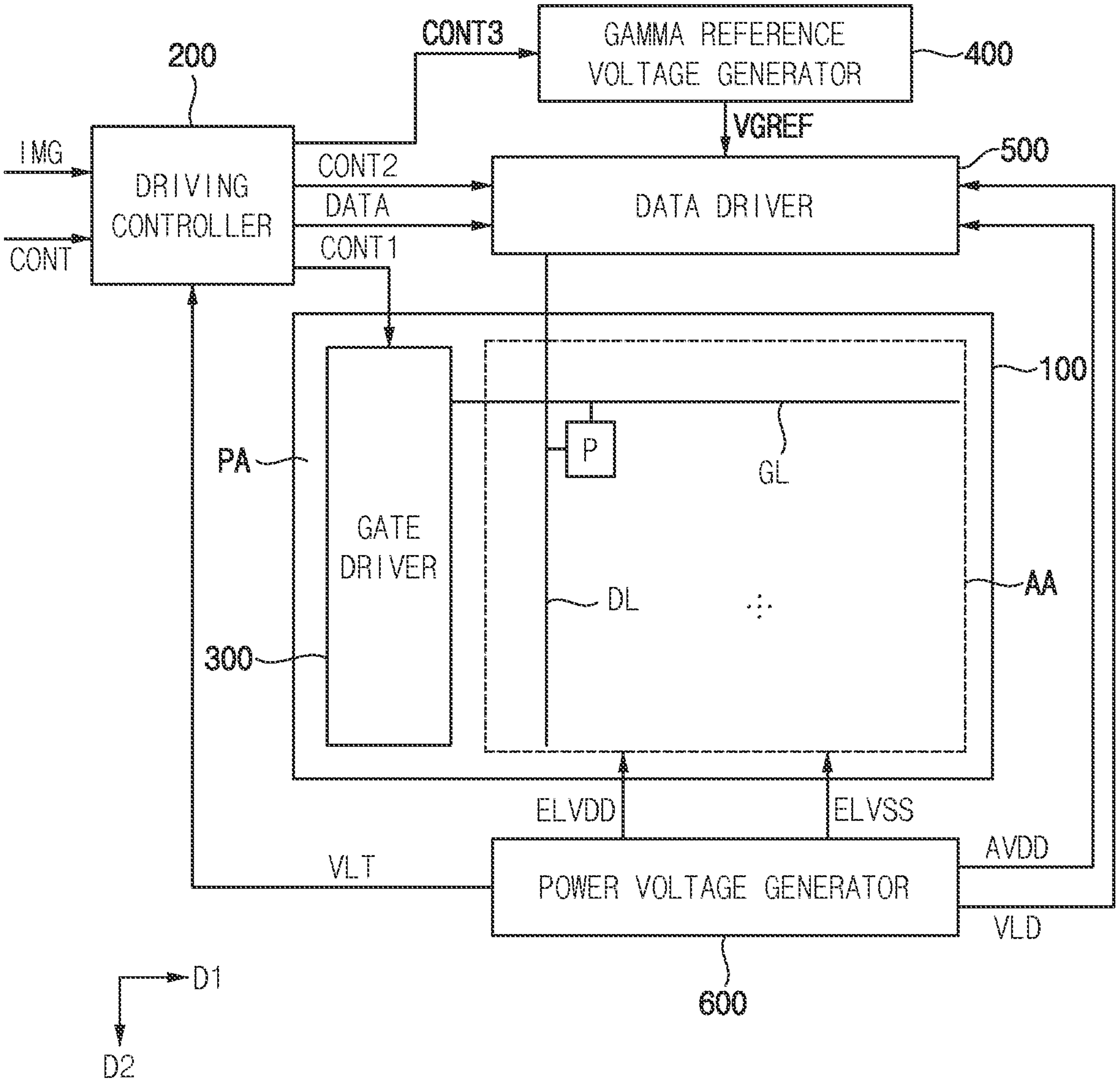
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

For example, the driving controller 200 and the data driver 500 may be integrally formed. In an embodiment, for example, the driving controller 200, the gamma reference voltage generator 400 and the data driver 500 may be integrally formed. A driving module including at least the driving controller 200 and the data driver 500 which are integrally formed may be called to a timing controller embedded data driver ("TED").

The display panel 100 includes a display region AA on which an image is displayed and a peripheral region PA adjacent to the display region AA.

The display panel 100 includes a plurality of gate lines GL, a plurality of data lines DL and a plurality of pixels connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a gate control signal CONT1, a data control signal CONT2, a gamma control signal CONT3 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may further include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

The gate driver 300 generates gate signals driving the gate lines GL in response to the gate control signal CONT1 received from the driving controller 200. The gate driver 300 outputs the gate signals to the gate lines GL. For example, the gate driver 300 may sequentially output the gate signals to the gate lines GL. In an embodiment, for example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a high display panel power voltage ELVDD and a low display panel power voltage ELVSS for driving the display panel 100 and output the high display panel power voltage ELVDD and the low display panel power voltage ELVSS to the display panel 100. In addition, the power voltage generator 600 may generate a first driving voltage VLT for driving the driving controller 200 and output the first driving voltage VLT to the driving controller 200. In addition, the power voltage generator 600 may generate a high data power voltage AVDD and a second driving voltage VLD for driving the data driver 500 and output the high data power voltage AVDD and the second driving voltage VLD to the data driver 500.

Figure 2:
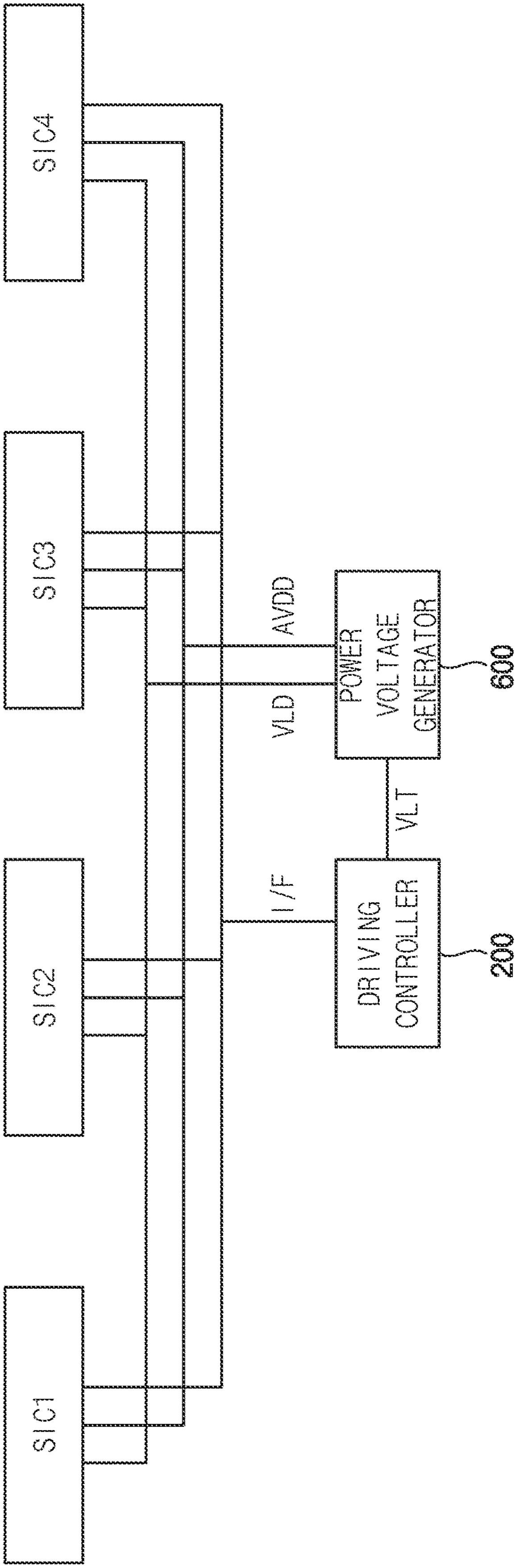
FIG. 2 is a block diagram illustrating a driving controller, a data driver and a power voltage generator of FIG. 1.

FIG. 2 is a block diagram illustrating the driving controller 200, the data driver 500 and the power voltage generator 600 of FIG. 1.

Referring to FIGS. 1 and 2, the data driver 500 may include a plurality of source driving chips SIC1, SIC2, SIC3 and SIC4. Although the data driver 500 includes four source driving chips SIC1, SIC2, SIC3 and SIC4 in FIG. 2, the present invention may not be limited thereto. Alternatively, the data driver 500 may include three or less source driving chips. Alternatively, the data driver 500 may include five or more source driving chips.

The driving controller 200 may output the data signal to the source driving chips SIC1, SIC2, SIC3 and SIC4 of the data driver 500 through an interface I/F.

The power voltage generator 600 may generate the first driving voltage VLT and output the first driving voltage VLT to the driving controller 200. The power voltage generator 600 may generate the high data power voltage AVDD and the second driving voltage VLD and output the high data power voltage AVDD and the second driving voltage VLD to the data driver 500.

Figure 3:
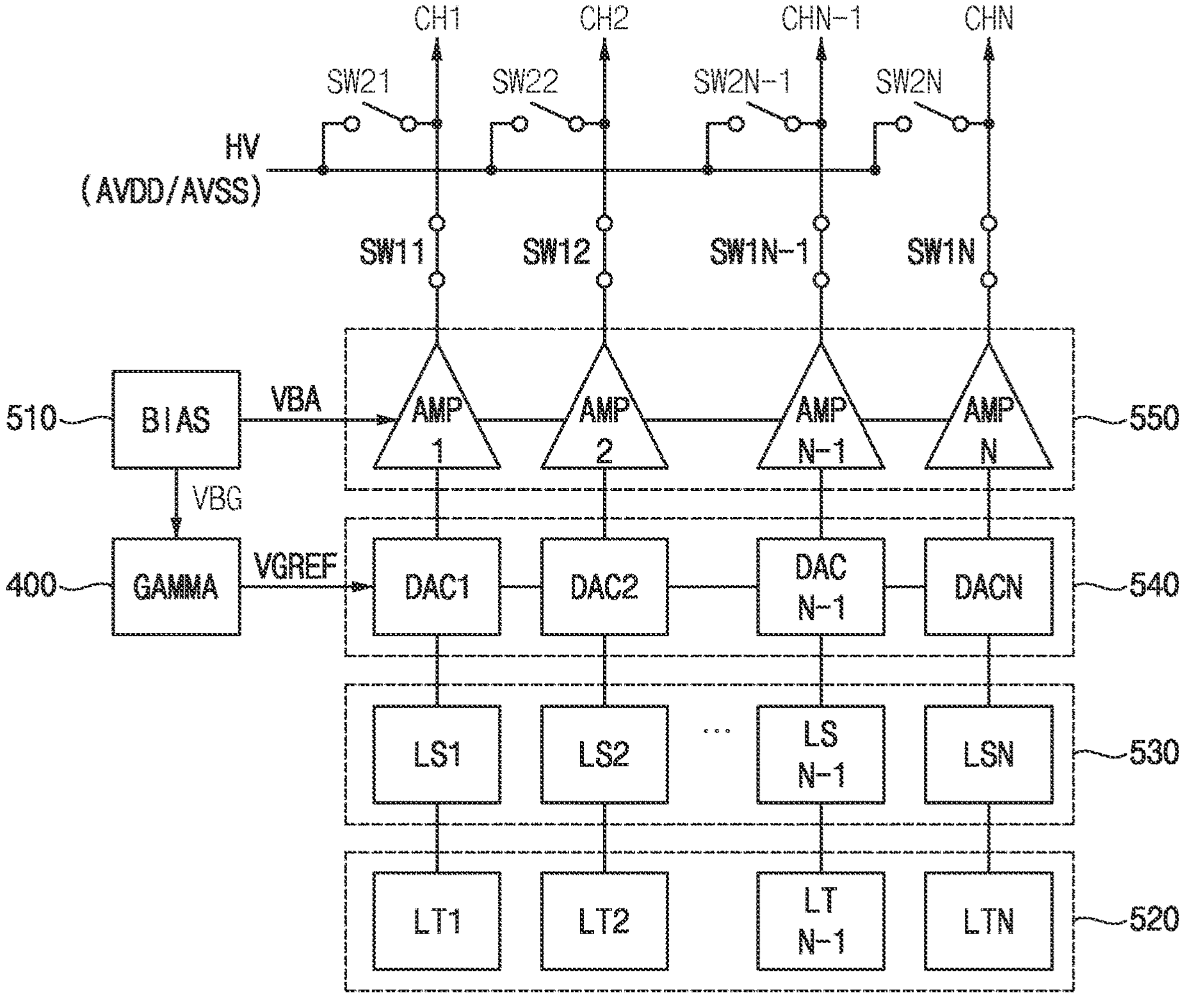
FIG. 3 is a diagram illustrating operations of the gamma reference voltage generator and the data driver of FIG. 1 in a normal mode.
Figure 4:
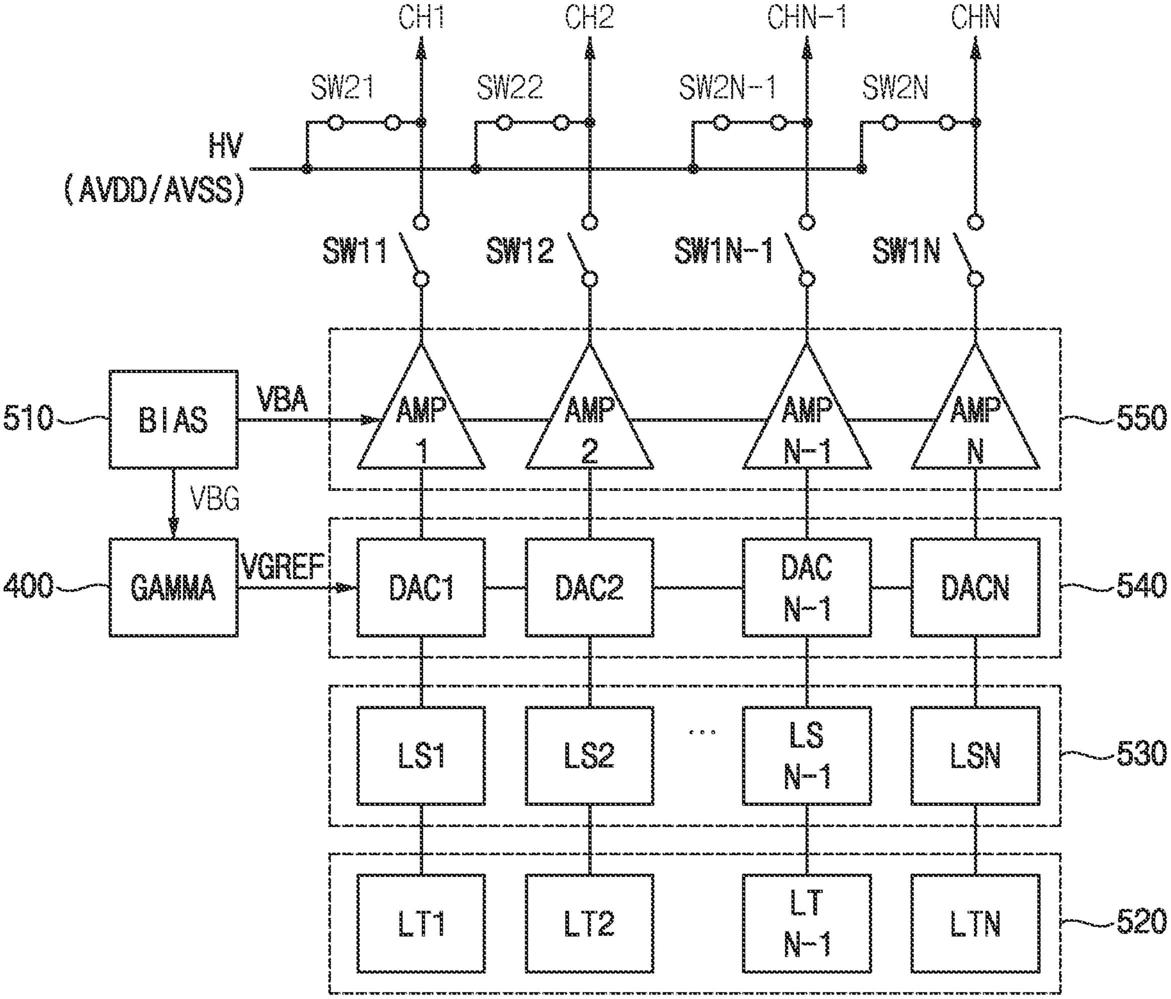
FIG. 4 is a diagram illustrating operations of the gamma reference voltage generator and the data driver of FIG. 1 in a black mode.

FIG. 3 is a diagram illustrating operations of the gamma reference voltage generator 400 and the data driver 500 of FIG. 1 in a normal mode. FIG. 4 is a diagram illustrating operations of the gamma reference voltage generator 400 and the data driver 500 of FIG. 1 in a black mode.

Referring to FIGS. 1 to 4, the data driver 500 may include a bias voltage applier 510, a latch circuit 520, a level shifter circuit 530, a digital-to-analog converter circuit 540 and an amplifier circuit 550.

The latch circuit 520 may include a plurality of latches LT1 to LTN corresponding to data lines. The level shifter circuit 530 may include a plurality of level shifters LS1 to LSN corresponding to data lines. The digital-to-analog converter circuit 540 may include a plurality of digital-to-analog converters DAC1 to DACN corresponding to data lines. The amplifier circuit 550 may include a plurality of amplifiers AMP1 to AMPN corresponding to data lines.

The latch circuit 520 may receive the data signal from the driving controller 200 and store the data signal.

The level shifter circuit 530 may convert the data signal having a low level to a high level data signal.

The digital-to-analog converter circuit 540 may convert the high level data signal to the data voltage having an analog type based on the gamma reference voltage VGREF.

The amplifier circuit 550 may output the data voltage to the data lines DL. The data lines DL may be connected to the amplifiers AMP1 to AMPN through channels CH1 to CHN.

The bias voltage applier 510 may output a first bias voltage VBG to the gamma reference voltage generator 400 and output a second bias voltage VBA to the amplifier circuit 550.

In an embodiment, the gamma reference voltage generator 400 may be disposed in the data driver 500. In an embodiment, the gamma reference voltage generator 400 may be disposed out of the data driver 500.

Most of the constant current in the display panel driver is a current by the gamma reference voltage generator 400 and the amplifier circuit 550 operated by the high data power voltage AVDD.

The blocks 400, 510, 520, 530, 540 and 500 illustrated in FIG. 3 may operate to drive the display panel 100. When the input image data IMG represent a black image, the amplifiers AMP1 to AMPN may output a gamma voltage corresponding to a grayscale value of zero. Even in this case, the constant current of the gamma reference voltage generator 400 and the amplifier circuit 550 is consumed, and accordingly, the power consumption of the display apparatus may increase.

When the input image data IMG display only a black image on the display panel 100 for more than a specific time, some elements of the gamma reference voltage generator 400 and the data driver 500 may be turned off so that the constant current of the gamma reference voltage generator 400 and the data driver 500 may be reduced, and accordingly, the power consumption of the display apparatus may be effectively reduced.

In the present embodiment, during the input image data IMG represent the black image, the bias voltage applier 510 may be turned off. When the bias voltage applier 510 is turned off, the bias voltage applier 510 does not apply the bias voltages VBG and VBA to the gamma reference voltage generator 400 and the amplifier circuit 550 so that operations of the gamma reference voltage generator 400 and the amplifier circuit 550 may be floated. In an embodiment, for example, during the input image data IMG represent the black image, the gamma reference voltage generator 400 and the amplifier circuit 550 may be turned off.

Herein, whether the input image data IMG represent the black image may be determined on a frame-by-frame basis. When the input image data IMG have a black grayscale value for all pixels during a frame, the input image data IMG may represent the black image in the frame. Herein, the black grayscale value may not be limited to the grayscale value of zero. The black grayscale value may include a grayscale value less than a predetermined threshold grayscale value. When the input image data IMG have a grayscale value less than the predetermined threshold grayscale value for all pixels during a frame, the input image data IMG may represent the black image in the frame.

The display apparatus may further include the channels CH1 to CHN, first switches SW11 to SW1N connected between output terminals of the amplifiers AMP1 to AMPN and the channels CH1 to CHN and second switches SW21 to SW2N connected between input terminal of a hold voltage HV and the channels CH1 to CHN.

Herein, the hold voltage HV may be the high data power voltage AVDD generated by the power voltage generator 600. However, the hold voltage may not be limited to the high data power voltage AVDD generated by the power voltage generator 600. In an embodiment, for example, the hold voltage may be a low data power voltage AVSS in a certain mode of the display panel 100. The hold voltage may be a predetermined direct current ("DC") voltage.

FIG. 3 represents a normal mode in which the input image data IMG includes image which is not the black image. In the normal mode, the input image data IMG may include a grayscale value which is not the black grayscale value.

As shown in FIG. 3, in the normal mode, the first switches SW11 to SW1N may be turned on and the second switches SW21 to SW2N may be turned off. In this case, the data lines DL are connected to the amplifiers AMP1 to AMPN through the channels CH1 to CHN and the first switches SW11 to SW1N and grayscale value voltages corresponding to the data lines DL may be applied to the data lines DL.

FIG. 4 represents a black mode in which the input image data IMG only includes the black image.

As shown in FIG. 4, in the black mode, the first switches SW11 to SW1N may be turned off and the second switches SW21 to SW2N may be turned on. In this case, the data lines DL are connected to the input terminal of the hold voltage HV through the channels CH1 to CHN and the second switches SW21 to SW2N and the hold voltage HV may be commonly applied to the data lines DL.

According to the present embodiment, when the display panel 100 displays the black image, the bias voltage applier 510 of the data driver 500 may be turned off so that the constant current of the data driver 500 may be reduced, and accordingly the power consumption of the display apparatus may be effectively reduced.

Figure 5:
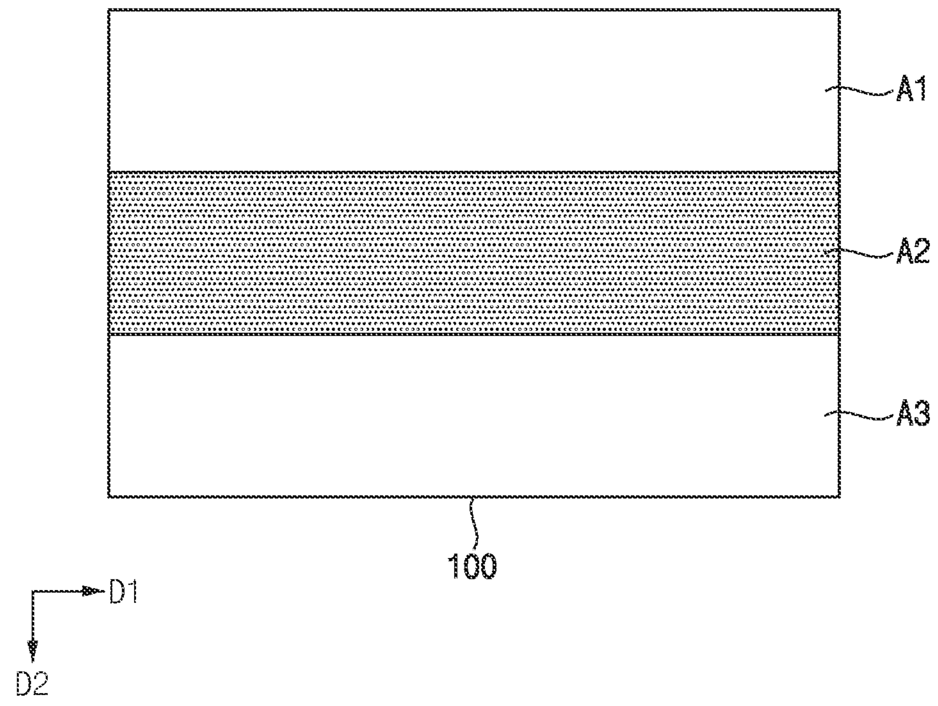
FIG. 5 is a diagram illustrating a case in which a display panel of a display apparatus according to an embodiment of the present invention displays a first black pattern extending in a first direction.
Figure 6:
FIG. 6 is a diagram illustrating a data signal transmitted from a driving controller of the display apparatus of FIG. 5 to a data driver of the display apparatus of FIG. 5.
Figure 7:
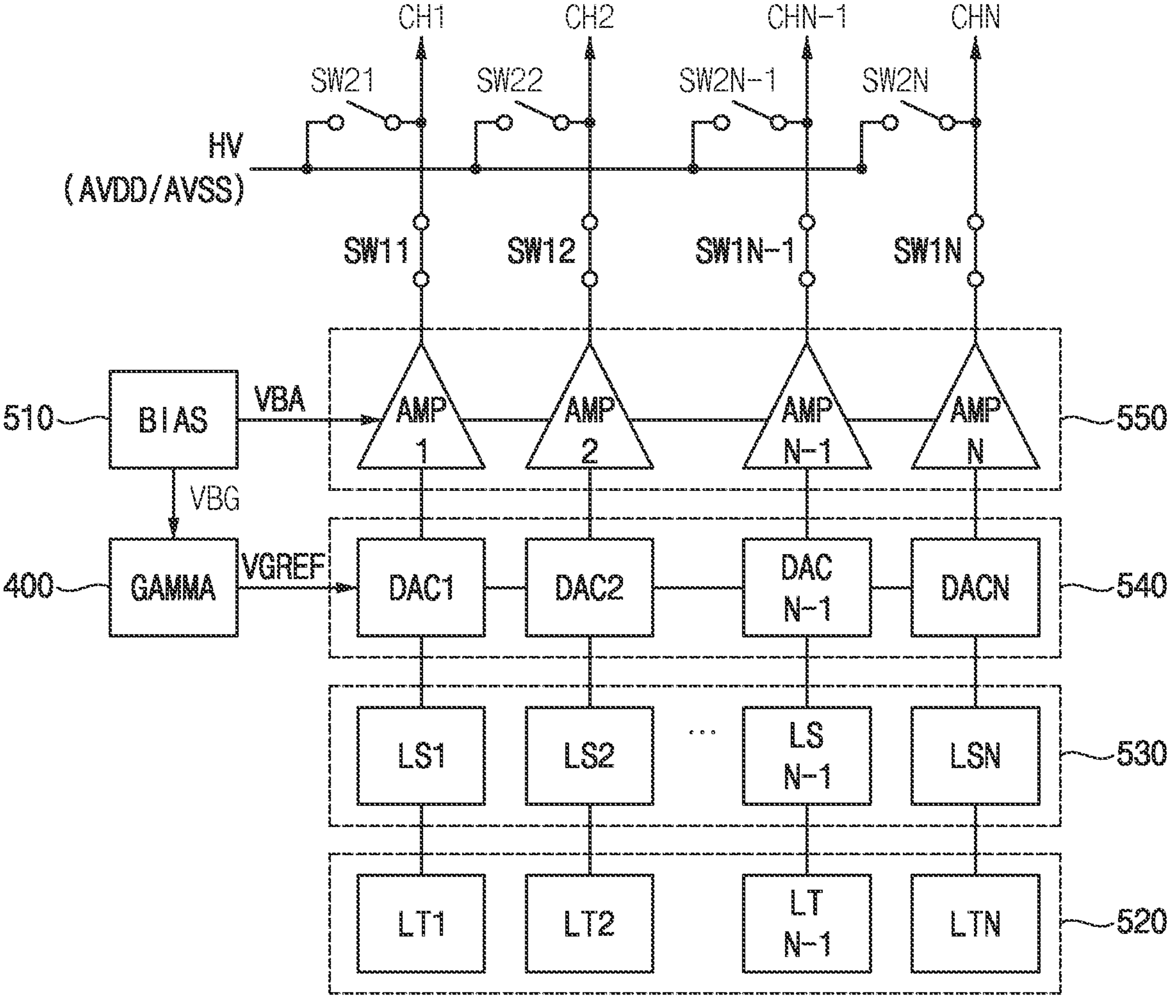
FIG. 7 is a diagram illustrating operations of a gamma reference voltage generator and a data driver corresponding to A1 area of FIG. 5.
Figure 8:
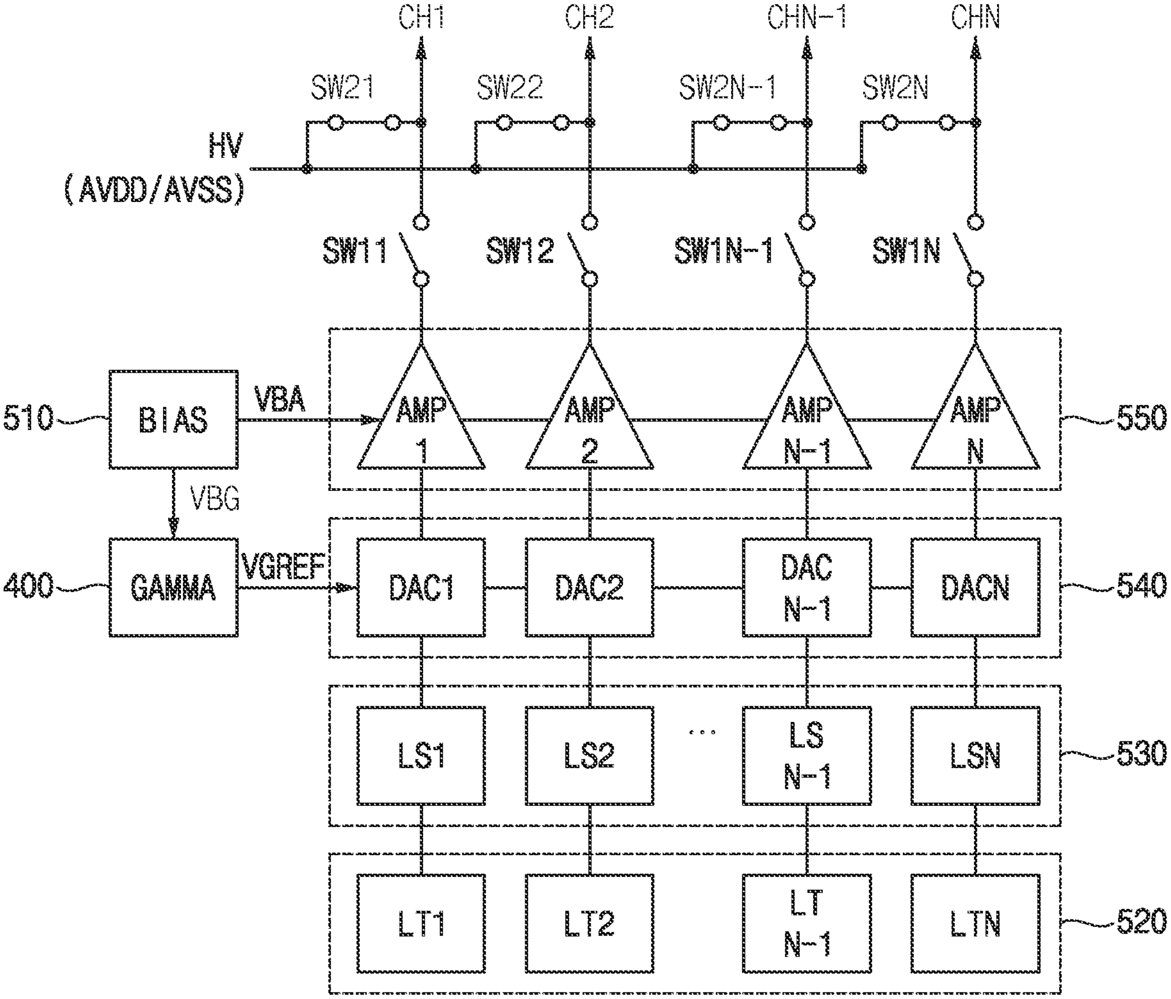
FIG. 8 is a diagram illustrating operations of the gamma reference voltage generator and the data driver corresponding to A2 area of FIG. 5.
Figure 9:
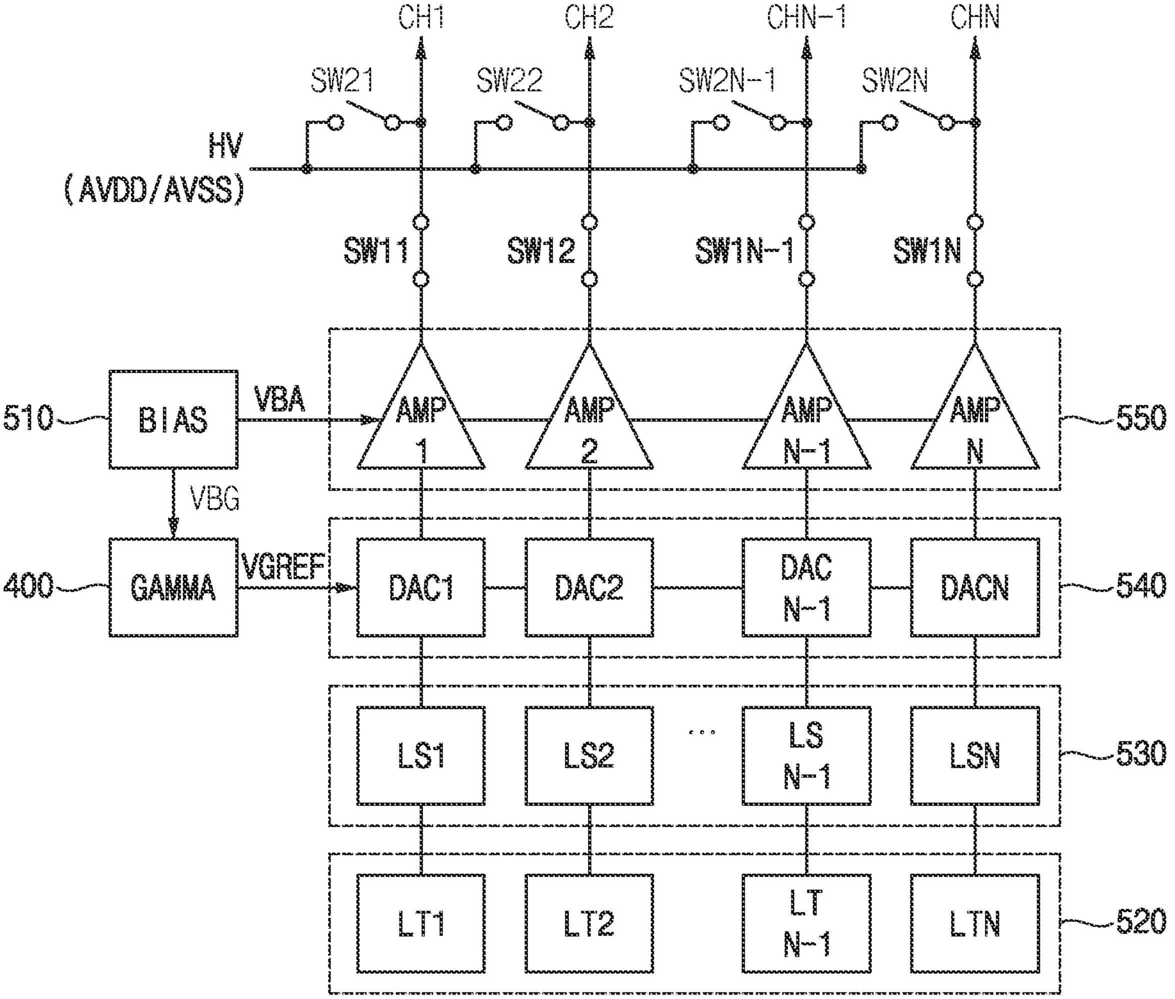
FIG. 9 is a diagram illustrating operations of the gamma reference voltage generator and the data driver corresponding to A3 area of FIG. 5.

FIG. 5 is a diagram illustrating a case in which a display panel 100 of a display apparatus according to an embodiment of the present invention displays a first black pattern extending in a first direction. FIG. 6 is a diagram illustrating a data signal transmitted from a driving controller 200 of the display apparatus of FIG. 5 to a data driver 500 of the display apparatus of FIG. 5. FIG. 7 is a diagram illustrating operations of a gamma reference voltage generator 400 and the data driver 500 corresponding to A1 area of FIG. 5. FIG. 8 is a diagram illustrating operations of the gamma reference voltage generator 400 and the data driver 500 corresponding to A2 area of FIG. 5. FIG. 9 is a diagram illustrating operations of the gamma reference voltage generator 400 and the data driver 500 corresponding to A3 area of FIG. 5.

The display apparatus according to the present embodiment are substantially the same as the display apparatus of the previous embodiment explained referring to FIGS. 1 to 4 except that the hold voltage is applied to the data lines during a black period corresponding to a horizontal black pattern when the horizontal black pattern (a first black pattern) is displayed. Thus, the same reference numerals will be used to refer to the same or like parts as those described in the previous embodiment of FIGS. 1 to 4 and any repetitive explanation concerning the above elements will be omitted.

In FIG. 5, a white image (a normal image) may be displayed on a first area (A1 area) of the display panel 100, a black image may be displayed on a second area (A2 area) of the display panel 100 and a white image (a normal image) may be displayed on a third area (A3 area) of the display panel 100. Herein, the first area (A1 area), the second area (A2 area) and the third area (A3 area) may extend in a direction (the first direction D1) perpendicular to an extension direction of the data line DL. The first black pattern displayed on the second area (A2 area) may extend in the first direction D1. For convenience of explanation, the first black pattern may be referred to as a horizontal black pattern. Herein, the normal image may mean an image which is not the black image. When the input image data IMG have at least one grayscale value equal to or greater than the predetermined threshold grayscale value during a frame, the input image data IMG may represent the normal image in the frame.

Referring to FIGS. 1 to 9, the display apparatus may include a display panel 100 including data lines DL, channels CH1 to CHN connected to the data lines DL and amplifiers AMP1 to AMPN for outputting data voltages, first switches SW11 to SW1N connected between output terminals of the amplifiers AMP1 to AMPN and the channels CH1 to CHN and second switches SW21 to SW2N connected between input terminal of a hold voltage HV and the channels CH1 to CHN.

When the data lines DL extend in the second direction D2 and the input image data IMG have a first black pattern extending in the first direction D1 perpendicular to the second direction D2, the first switches SW11 to SW1N may be turned off and the second switches SW21 to SW2N may be turned on during a black period corresponding to the first black pattern and the first switches SW11 to SW1N may be turned on and the second switches SW21 to SW2N may be turned off during a normal period not corresponding to the first black pattern.

FIG. 7 may correspond to the first area (A1 area) and the first area (A1 area) may correspond to the normal period in which the input image data IMG have the white image (the normal image).

As shown in FIG. 7, in the normal period, the first switches SW11 to SW1N may be turned on and the second switches SW21 to SW2N may be turned off. In this case, the data lines DL are connected to the amplifiers AMP1 to AMPN through the channels CH1 to CHN and the first switches SW11 to SW1N and grayscale value voltages corresponding to the data lines DL may be applied to the data lines DL.

FIG. 8 may correspond to the second area (A2 area) and the second area (A2 area) may correspond to the black period in which the input image data IMG have only the black image.

As shown in FIG. 8, in the black period, the first switches SW11 to SW1N may be turned off and the second switches SW21 to SW2N may be turned on. In this case, the data lines DL are connected to the input terminal of the hold voltage HV through the channels CH1 to CHN and the second switches SW21 to SW2N and the hold voltage HV may be commonly applied to the data lines.

FIG. 9 may correspond to the third area (A3 area) and the third area (A3 area) may correspond to the normal period in which the input image data IMG have the white image (the normal image).

As shown in FIG. 9, in the normal period, the first switches SW11 to SW1N may be turned on and the second switches SW21 to SW2N may be turned off. In this case, the data lines DL are connected to the amplifiers AMP1 to AMPN through the channels CH1 to CHN and the first switches SW11 to SW1N and grayscale value voltages corresponding to the data lines DL may be applied to the data lines DL.

As shown in FIG. 6, the data signal DATA may include a line configuration LC and line data LDATA. A setting signal representing the black period and the normal period may be included in the line configuration LC. The setting signal may be transmitted from the driving controller 200 to the data driver 500 in the line configuration LC format.

In addition, when proceeding from the black period to the normal period, it may be hard that the first switches SW11 to SW1N and the second switches SW21 to SW2N, the bias voltage applier 510, the gamma reference voltage generator 400 and the amplifier circuit 550 are turned on and operate a normal operation within a short period of time. Thus, when proceeding from the black period to the normal period, the setting signal may be determined based on a wakeup time. When proceeding from the black period to the normal period, the setting signal may indicate the normal period corresponding to a horizontal line several horizontal lines before a transition horizontal line.

In the present embodiment, in the black period, the bias voltage applier 510 may be turned off. In addition, in the black period, the gamma reference voltage generator 400 and the amplifiers AMP1 to AMPN may be turned off.

According to the present embodiment, when the display panel 100 displays the black image, the bias voltage applier 510 of the data driver 500 may be turned off so that the constant current of the data driver 500 may be reduced, and accordingly the power consumption of the display apparatus may be effectively reduced.

When the display panel 100 displays the horizontal black pattern extending in the first direction D1, for a time corresponding to the horizontal black pattern, the outputs of the amplifiers AMP1 to AMPN may be blocked and the output of the data driver 500 may be connected to the predetermined hold voltage HV so that the constant current of the data driver 500 may be reduced, and accordingly the power consumption of the display apparatus may be effectively reduced.

Figure 10:
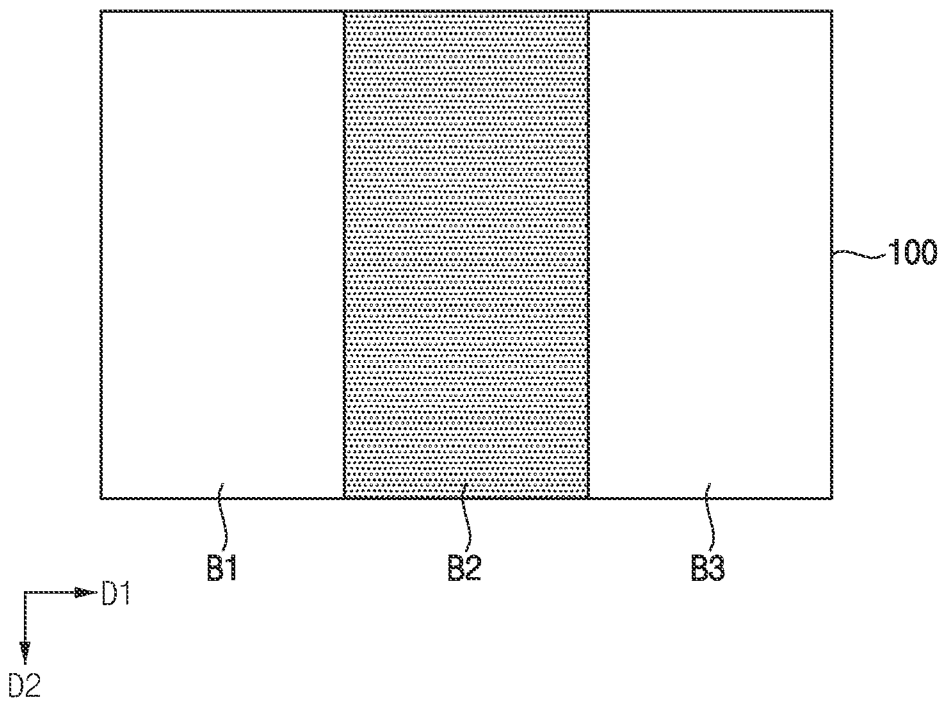
FIG. 10 is a diagram illustrating a case in which a display panel of a display apparatus according to an embodiment of the present invention displays a second black pattern extending in a second direction.
Figure 11:
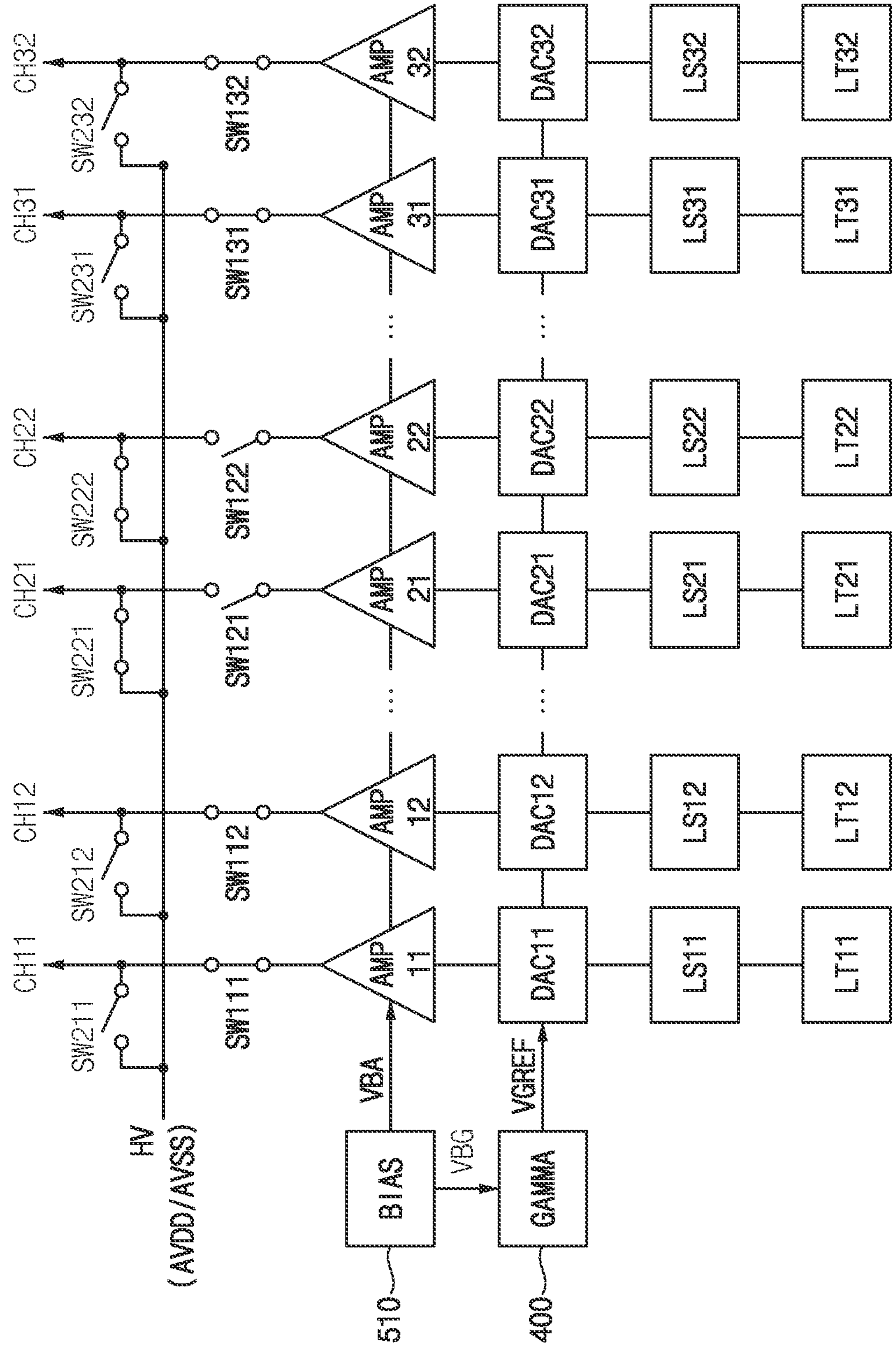
FIG. 11 is a diagram illustrating operations of a gamma reference voltage generator and a data driver corresponding to the second black pattern of FIG. 10.
Figure 12:
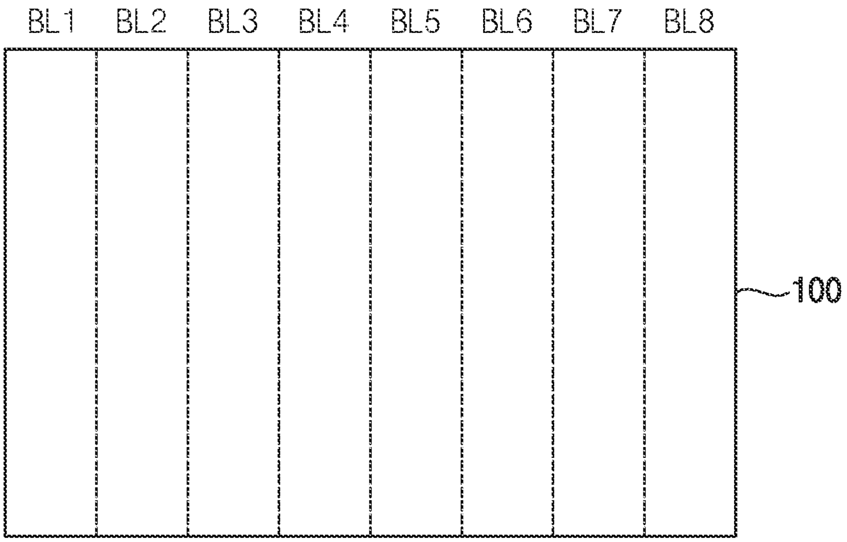
FIG. 12 is a diagram illustrating a case in which the display panel of FIG. 10 is divided into eight display blocks.
Figure 13:
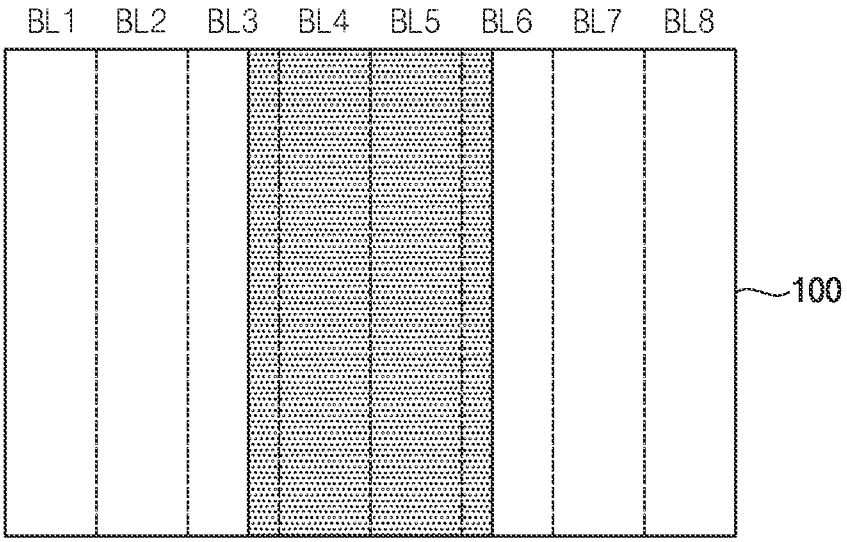
FIG. 13 is a diagram illustrating a case in which the display panel of FIG. 10 is divided into eight display blocks and the display panel displays the second black pattern extending in the second direction.

FIG. 10 is a diagram illustrating a case in which a display panel 100 of a display apparatus according to an embodiment of the present invention displays a second black pattern extending in a second direction D2. FIG. 11 is a diagram illustrating operations of a gamma reference voltage generator 400 and a data driver 500 corresponding to the second black pattern of FIG. 10. FIG. 12 is a diagram illustrating a case in which the display panel 100 of FIG. 10 is divided into eight display blocks. FIG. 13 is a diagram illustrating a case in which the display panel 100 of FIG. 10 is divided into eight display blocks and the display panel 100 displays the second black pattern extending in the second direction D2.

The display apparatus according to the present embodiment are substantially the same as the display apparatus of the previous embodiment explained referring to FIGS. 1 to 4 except that the hold voltage is applied to the data lines corresponding to a vertical black pattern when the vertical black pattern (a second black pattern) is displayed. Thus, the same reference numerals will be used to refer to the same or like parts as those described in the previous embodiment of FIGS. 1 to 4 and any repetitive explanation concerning the above elements will be omitted.

In FIG. 10, a white image (a normal image) may be displayed on a first display block (B1 area) of the display panel 100, a black image may be displayed on a second display block (B2 area) of the display panel 100 and a white image (a normal image) may be displayed on a third display block (B3 area) of the display panel 100. Herein, the first display block (B1 area), the second display block (B2 area) and the third display block (B3 area) may extend in an extension direction (the second direction D2) of the data line DL. The second black pattern displayed on the second display block (B2 area) may extend in the second direction D2. For convenience of explanation, the second black pattern may be referred to as a vertical black pattern.

Referring to FIGS. 1 to 4 and 10 to 13, the display apparatus may include a display panel 100 including the first display block (B1 area) and the second display block (B2 area), a first channel CH11 and CH12 connected to the data line DL in the first display block (B1 area), a first amplifier AMP11 and AMP12 for outputting a data voltage to the first channel CH11 and CH12, A-1 switch SW111 and SW112 connected between an output terminal of the first amplifier AMP11 and AMP12 and the first channel CH11 and CH12, B-1 switch SW211 and SW212 connected between an input terminal of the hold voltage HV and the first channel CH11 and CH12, a second channel CH21 and CH22 connected to the data line DL in the second display block (B2 area), a second amplifier AMP21 and AMP22 for outputting a data voltage to the second channel CH21 and CH22, A-2 switch SW121 and SW122 connected between an output terminal of the second amplifier AMP21 and AMP22 and the second channel CH21 and CH22 and B-2 switch SW221 and SW222 connected between an input terminal of the hold voltage HV and the second channel CH21 and CH22.

In the present embodiment, the A-1 switch SW11*l* and SW112 and the B-1 switch SW211 and SW212 may be controlled independently from the A-2 switch SW121 and SW122 and the B-2 switch SW221 and SW222.

The A-1 switch SW111 and SW112 and the B-1 switch SW211 and SW212 may be controlled dependently. In an embodiment, for example, when the A-1 switch SW111 and SW112 is turned on, the B-1 switch SW211 and SW212 may be turned off. When the A-1 switch SW111 and SW112 is turned off, the B-1 switch SW211 and SW212 may be turned on.

Similarly, the A-2 switch SW121 and SW122 and the B-2 switch SW221 and SW222 may be controlled dependently.

In addition, the display panel 100 may further include a third display block (B3 area) and the display apparatus may further include channels CH31 and CH32, amplifiers AMP31 and AMP32 and switches SW131, SW132, SW231 and SW232 corresponding the third display block (B3 area).

In this case, the A-1 switch SW111 and SW112 and the B-1 switch SW211 and SW212 may be controlled independently from the A-2 switch SW121 and SW122 and the B-2 switch SW221 and SW222, the A-1 switch SW111 and SW112 and the B-1 switch SW211 and SW212 may be controlled independently from the A-3 switch SW131 and SW132 and the B-3 switch SW231 and SW232, and the A-2 switch SW121 and SW122 and the B-2 switch SW221 and SW222 may be controlled independently from the A-3 switch SW131 and SW132 and the B-3 switch SW231 and SW232.

In an embodiment, for example, when the data line DL extends in the second direction D2, the input image data IMG have a second black pattern extending in the second direction D2 and the second black pattern overlaps an entirety of the first display block (B1 area), the A-1 switch SW111 and SW112 corresponding to the first display block may be turned off and the B-1 switch SW211 and SW212 corresponding to the first display block may be turned on. The channels CH11 and CH12 corresponding to the first display block (B1 area) may output the hold voltage HV.

In an embodiment, for example, when the data line DL extends in the second direction D2, the input image data IMG have a second black pattern extending in the second direction D2 and the second black pattern overlaps an entirety of the second display block (B2 area), the A-2 switch SW121 and SW122 corresponding to the second display block may be turned off and the B-2 switch SW221 and SW222 corresponding to the second display block may be turned on. The channels CH21 and CH22 corresponding to the second display block (B2 area) may output the hold voltage HV.

In an embodiment, for example, when the data line DL extends in the second direction D2, the input image data IMG have a second black pattern extending in the second direction D2 and the second black pattern partially overlaps the first display block (B1 area) or does not overlap the first display block (B1 area), the A-1 switch SW11*l* and SW112 corresponding to the first display block may be turned on and the B-1 switch SW211 and SW212 corresponding to the first display block may be turned off. The channels CH11 and CH12 corresponding to the first display block may output the normal data voltages.

In an embodiment, for example, when the data line DL extends in the second direction D2, the input image data IMG have a second black pattern extending in the second direction D2 and the second black pattern partially overlaps the second display block (B2 area) or does not overlap the second display block (B2 area), the A-2 switch SW121 and SW122 corresponding to the second display block may be turned on and the B-2 switch SW221 and SW222 corresponding to the second display block may be turned off. The channels CH21 and CH22 corresponding to the second display block may output the normal data voltages.

The switches independently operate for the display blocks so that some switches may operate to output the normal data voltages and some switches may output the hold voltage HV.

When the data line DL extends in the second direction D2, the input image data IMG have a second black pattern extending in the second direction D2, the second black pattern overlaps the entirety of the first display block, and the second black pattern partially overlaps the second display block or does not overlap the second display block, the A-1 switch SW111 and SW112 may be turned off, the B-1 switch SW211 and SW212 may be turned on, the A-2 switch SW121 and SW122 may be turned on and the B-2 switch SW221 and SW222 may be turned off. The channels CH11 and CH12 corresponding to the first display block may output the hold voltage and the channels CH21 and CH22 corresponding to the second display block may output the normal data voltage.

In FIG. 12, the display panel 100 may be divided into eight display blocks BL1 to BL8. Herein, the data driver 500 may be divided into data output blocks.

When the vertical black pattern is displayed like FIG. 13, data output blocks corresponding to a fourth display block BL4 and a fifth display block BL5 may output the hold voltage. In contrast, data output blocks corresponding to display blocks except for the fourth display block BL4 and the fifth display block BL5 may output the normal data voltages.

In the present embodiment, while the input image data IMG have the black image for all display blocks in the display panel 100, the bias voltage applier 510 may be turned off.

In addition, while the input image data IMG have the black image for all display blocks in the display panel 100, the gamma reference voltage generator 400 and the amplifier circuit 550 may also be turned off.

According to the present embodiment, when the display panel 100 displays the black image, the bias voltage applier 510 of the data driver 500 may be turned off so that the constant current of the data driver 500 may be reduced, and accordingly the power consumption of the display apparatus may be effectively reduced.

When the display panel 100 displays the vertical black pattern extending in the second direction D2, the outputs of the amplifiers corresponding to the vertical black pattern may be blocked and the output of the area of the data driver 500 corresponding to the vertical black pattern may be connected to the predetermined hold voltage HV so that the constant current of the data driver 500 may be reduced, and accordingly the power consumption of the display apparatus may be effectively reduced.

Figure 14:
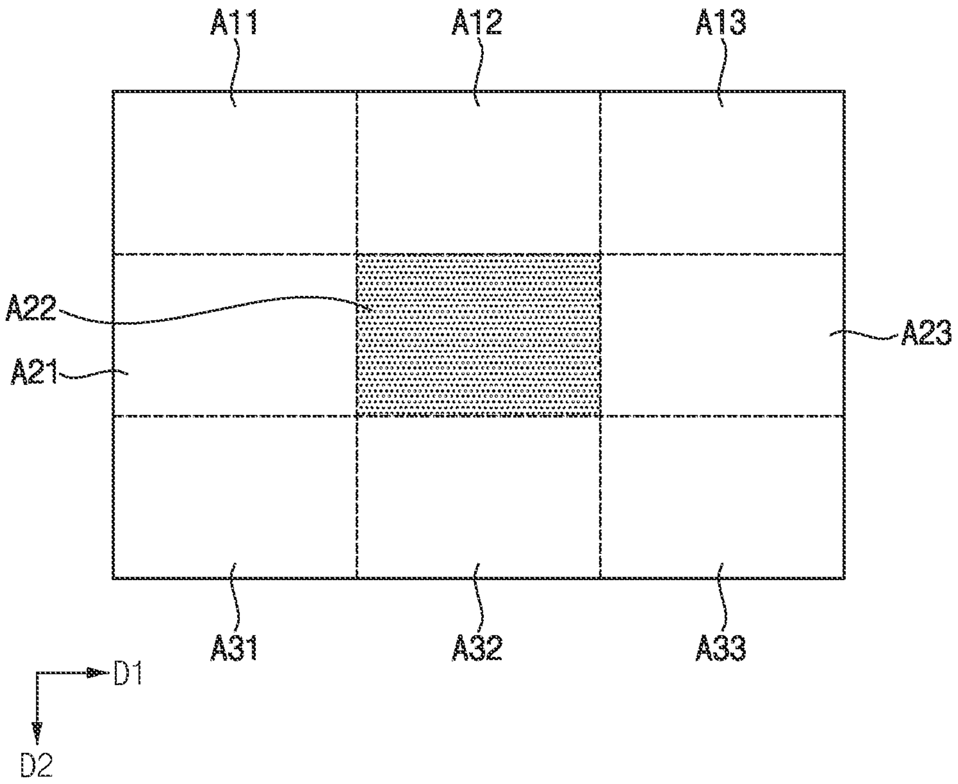
FIG. 14 is a diagram illustrating a case in which a display block extending in a second direction in a display panel of a display apparatus according to an embodiment of the present invention displays a first black pattern extending in a first direction.
Figure 15:
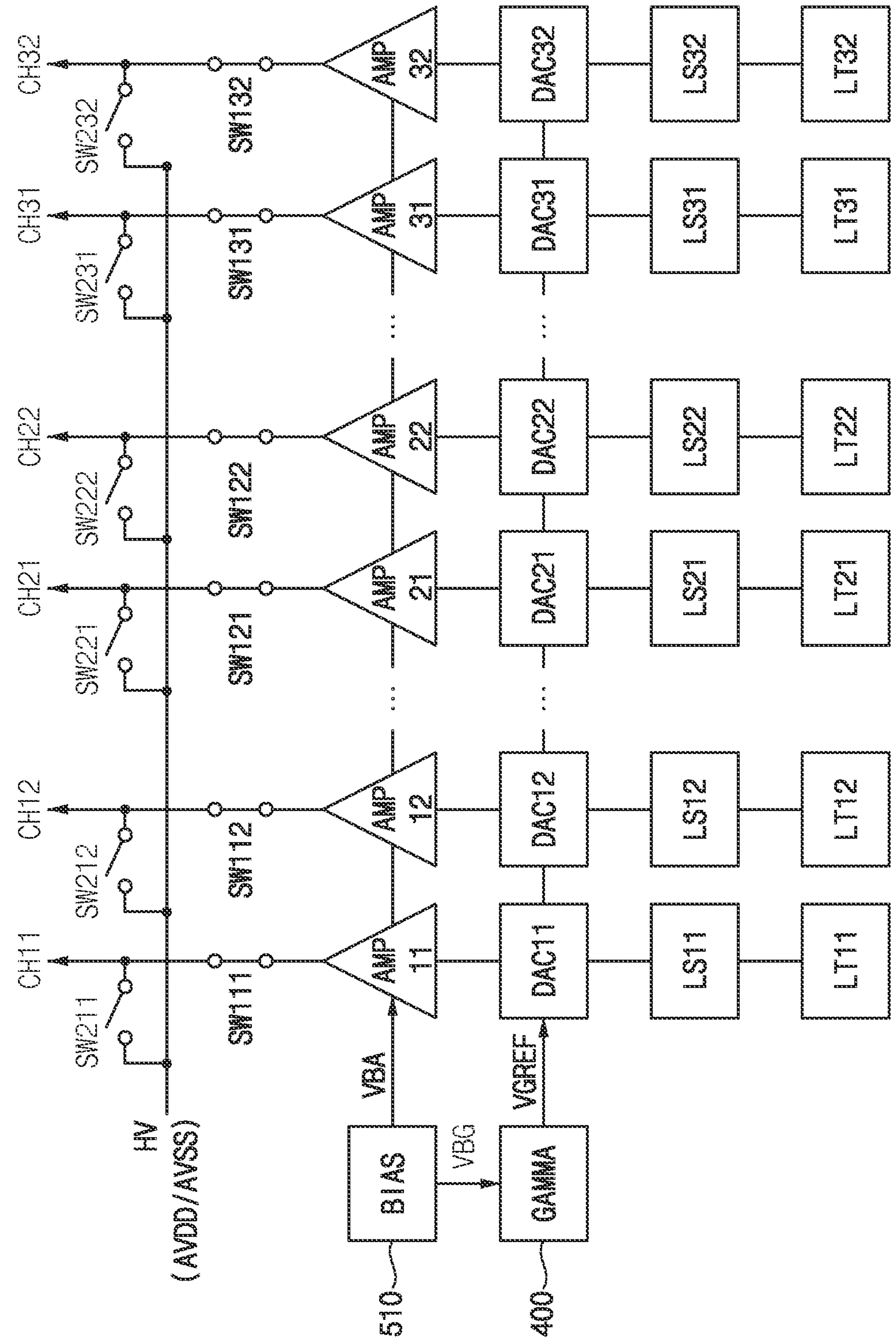
FIG. 15 is a diagram illustrating operations of a gamma reference voltage generator and a data driver corresponding to A11 area, A12 area and A13 area of FIG. 14.
Figure 16:
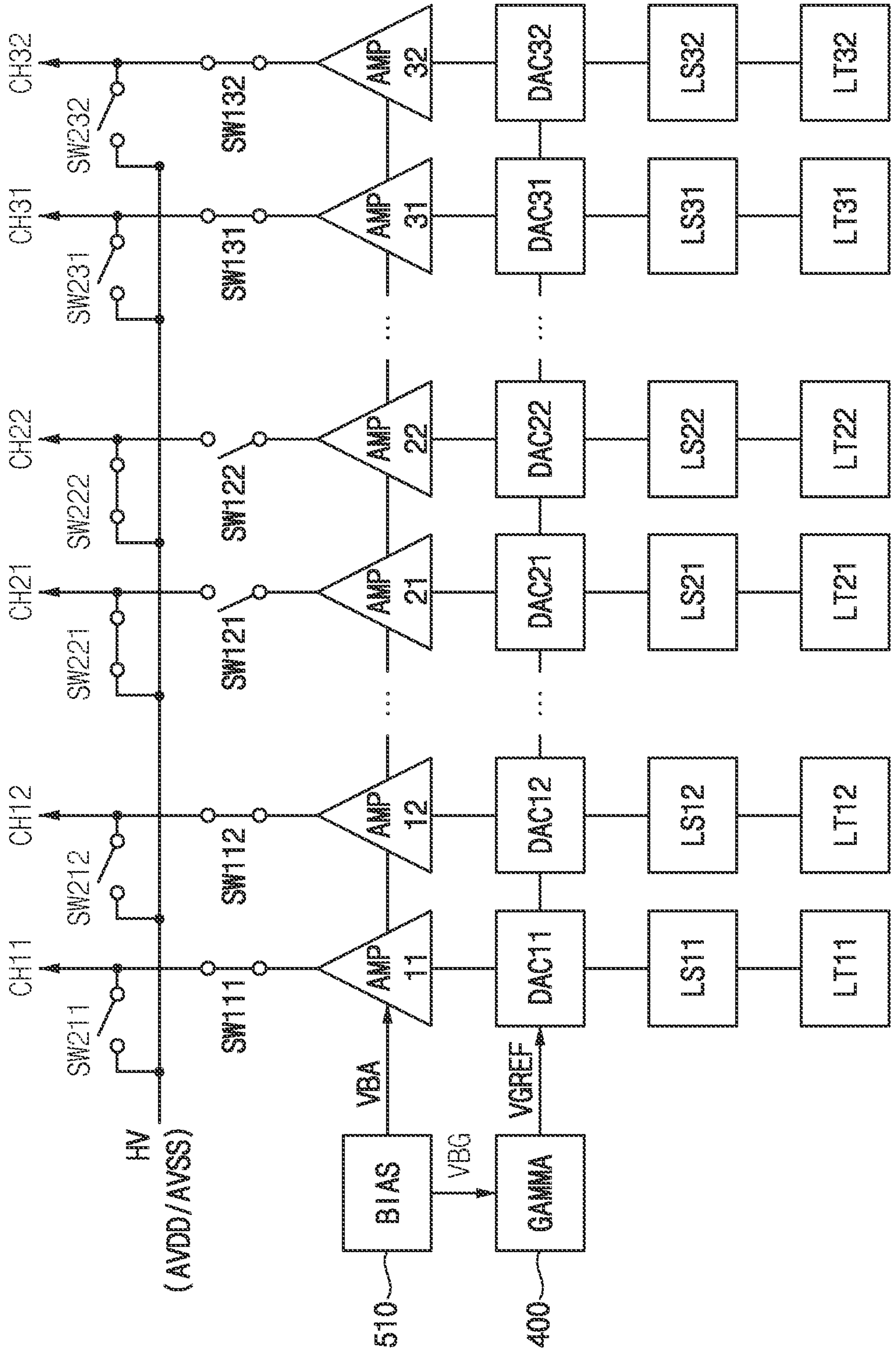
FIG. 16 is a diagram illustrating operations of the gamma reference voltage generator and the data driver corresponding to A21 area, A22 area and A23 area of FIG. 14.
Figure 17:
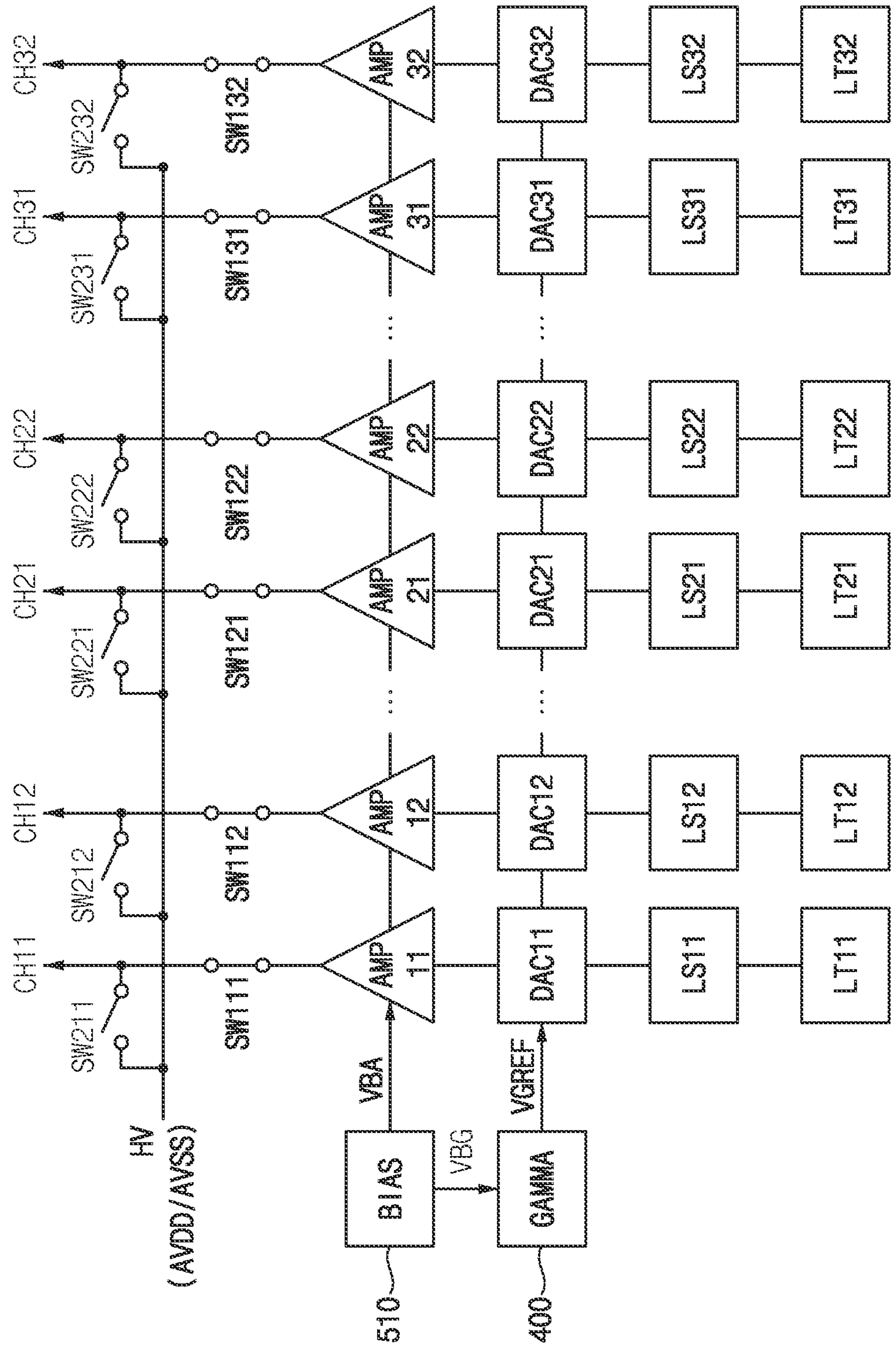
FIG. 17 is a diagram illustrating operations of the gamma reference voltage generator and the data driver corresponding to A31 area, A32 area and A33 area of FIG. 14.

FIG. 14 is a diagram illustrating a case in which a display block extending in a second direction D2 in a display panel 100 of a display apparatus according to an embodiment of the present invention displays a first black pattern extending in a first direction D1. FIG. 15 is a diagram illustrating operations of a gamma reference voltage generator 400 and a data driver 500 corresponding to A11 area, A12 area and A13 area of FIG. 14. FIG. 16 is a diagram illustrating operations of the gamma reference voltage generator 400 and the data driver 500 corresponding to A21 area, A22 area and A23 area of FIG. 14. FIG. 17 is a diagram illustrating operations of the gamma reference voltage generator 400 and the data driver 500 corresponding to A31 area, A32 area and A33 area of FIG. 14.

The display apparatus according to the present embodiment are substantially the same as the display apparatus of the previous embodiment explained referring to FIGS. 1 to 4 except that an embodiment of applying the hold voltage to the data lines during a black period corresponding to a horizontal black pattern when the horizontal black pattern (a first black pattern) is displayed and an embodiment of applying the hold voltage to the data lines corresponding to a vertical black pattern when the vertical black pattern (a second black pattern) is displayed are combined. Thus, the same reference numerals will be used to refer to the same or like parts as those described in the previous embodiment of FIGS. 1 to 4 and any repetitive explanation concerning the above elements will be omitted.

In FIG. 14, a black image may be displayed on a fifth display area (A22 area) of the display panel 100, and normal image may be displayed on display areas (A11, A12, A13, A21, A23, A31, A32 and A33 areas) except for the fifth display area (A22 area).

Referring to FIGS. 1 to 15, in the present embodiment, the A-1 switch SW111 and SW112 and the B-1 switch SW211 and SW212 corresponding to the A11, A21 and A31 areas may be controlled independently from the A-2 switch SW121 and SW122 and the B-2 switch SW221 and SW222 corresponding to the A12, A22 and A32 areas.

In an embodiment, for example, when the data line DL extends in the second direction D2, the input image data IMG have a third black pattern extending in the first direction D1 perpendicular to the second direction D2 in the second display block A12, A22 and A32 areas, the A-2 switch may be turned off and the B-2 switch may be turned on during a black period corresponding to the third black pattern and the A-2 switch may be turned on and the B-2 switch may be turned off during a normal period not corresponding to the third black pattern.

The normal period corresponding to A11, A12 and A13 areas of FIG. 14 may be substantially the same as the normal period of FIG. 7. Thus, in the normal period, the first switches SW11 to SW1N may be turned on and the second switches SW21 to SW2N may be turned off during the normal period. In this case, the data lines DL are connected to the amplifiers AMP1 to AMPN through the channels CH1 to CHN and the first switches SW11 to SW1N and grayscale value voltages corresponding to the data lines DL may be applied to the data lines DL.

The normal period corresponding to A31, A32 and A33 areas of FIG. 14 may be substantially the same as the normal period of FIG. 9. Thus, in the normal period, the first switches SW11 to SW1N may be turned on and the second switches SW21 to SW2N may be turned off during the normal period. In this case, the data lines DL are connected to the amplifiers AMP1 to AMPN through the channels CH1 to CHN and the first switches SW11 to SW1N and grayscale value voltages corresponding to the data lines DL may be applied to the data lines DL.

A partial black period corresponding to A21, A22 and A23 areas of FIG. 14 may be substantially the same as the period of FIG. 11. Thus, the A-1 switch SW111 and SW112 and the B-1 switch SW211 and SW212 may be controlled independently from the A-2 switch SW121 and SW122 and the B-2 switch SW221 and SW222, the A-1 switch SW111 and SW112 and the B-1 switch SW211 and SW212 may be controlled independently from the A-3 switch SW131 and SW132 and the B-3 switch SW231 and SW232, and the A-2 switch SW121 and SW122 and the B-2 switch SW221 and SW222 may be controlled independently from the A-3 switch SW131 and SW132 and the B-3 switch SW231 and SW232.

When only the A22 area includes the black image as shown in FIG. 14, the channels CH21 and CH22 corresponding to the A22 area may output the hold voltage, the channels CH11 and CH12 corresponding to the A21 area and the channels CH31 and CH32 corresponding to the A23 area may output the normal data voltage for a time period corresponding to the A21, A22 and A23 areas.

As shown in FIG. 6, the data signal may include a line configuration LC and line data LDATA. A setting signal representing the black period and the normal period may be included in the line configuration LC. The setting signal may be transmitted from the driving controller 200 to the data driver 500 in the line configuration LC format.

In the present embodiment, the black period and the normal period is set for each line and the black output and the normal output may be set for each output block of the data driver 500 according to the display blocks of the display panel 100 in the second direction D2.

Thus, in the present embodiment, the line configuration may include information of the display block. When the display panel 100 includes a first display block and a second display block extending in the second direction D2, the line configuration may include a first display block setting signal representing the black period of the first display block and the normal period of the first display block and a second display block setting signal representing the black period of the second display block and the normal period of the second display block.

According to the present embodiment, when the display panel 100 displays the black image, the bias voltage applier 510 of the data driver 500 may be turned off so that the constant current of the data driver 500 may be reduced, and accordingly the power consumption of the display apparatus may be effectively reduced.

When the display panel 100 displays the horizontal black pattern extending in the first direction D1, for a time corresponding to the horizontal black pattern, the outputs of the amplifiers AMP1 to AMPN may be blocked and the output of the data driver 500 may be connected to the predetermined hold voltage HV so that the constant current of the data driver 500 may be reduced, and accordingly the power consumption of the display apparatus may be effectively reduced.

When the display panel 100 displays the vertical black pattern extending in the second direction D2, the outputs of the amplifiers corresponding to the vertical black pattern may be blocked and the output of the area of the data driver 500 corresponding to the vertical black pattern may be connected to the predetermined hold voltage HV so that the constant current of the data driver 500 may be reduced, and accordingly the power consumption of the display apparatus may be effectively reduced.

When the display block of the display panel 100 extending in the second direction D2 displays the horizontal black pattern extending in the first direction D1, for a time corresponding to the horizontal black pattern, the outputs of the amplifiers corresponding to the display block may be blocked and the output of the area of the data driver 500 corresponding to the display block may be connected to the predetermined hold voltage HV so that the constant current of the data driver 500 may be reduced, and accordingly the power consumption of the display apparatus may be effectively reduced.

Figure 18:
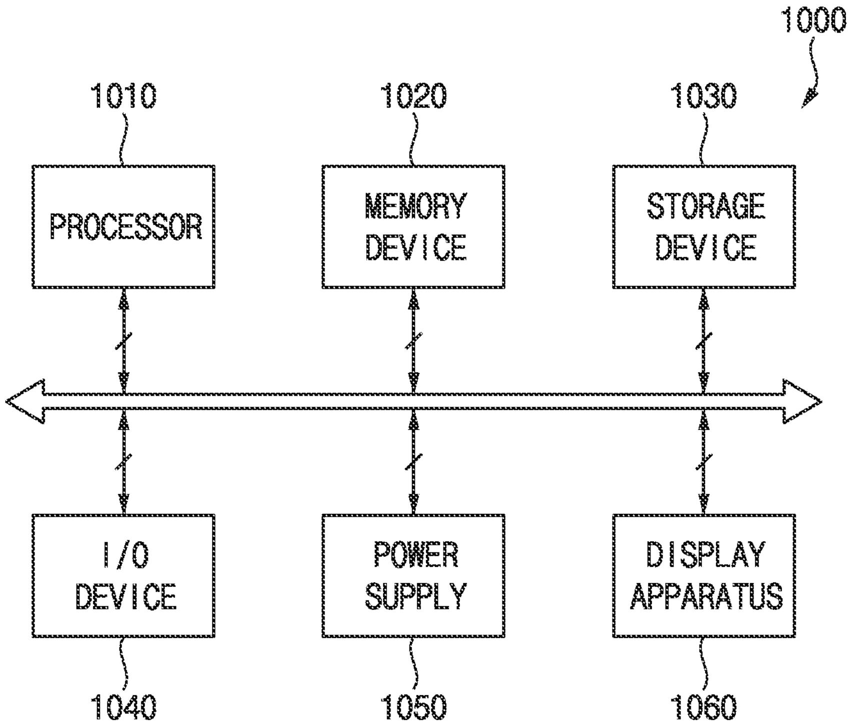
FIG. 18 is a block diagram illustrating an electronic apparatus according to an embodiment of the present invention.
Figure 19:
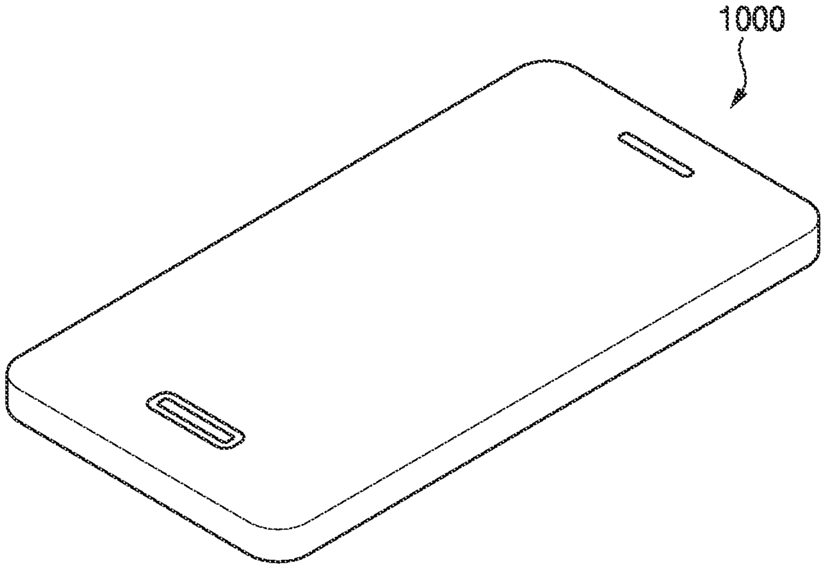
FIG. 19 is a diagram illustrating an example in which the electronic apparatus of FIG. 18 is implemented as a smart phone.

FIG. 18 is a block diagram illustrating an electronic apparatus according to an embodiment of the present invention. FIG. 19 is a diagram illustrating an example in which the electronic apparatus of FIG. 18 is implemented as a smart phone.

Referring to FIGS. 18 and 19, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus ("USB") device, other electronic apparatuses, etc.

In an embodiment, as illustrated in FIG. 19, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display ("HMD") device, or the like.

The processor 1010 may perform various computing functions or various tasks. The processor 1010 may be a micro-processor, a central processing unit ("CPU"), an application processor ("AP"), or the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD- ROM device, or the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 20:
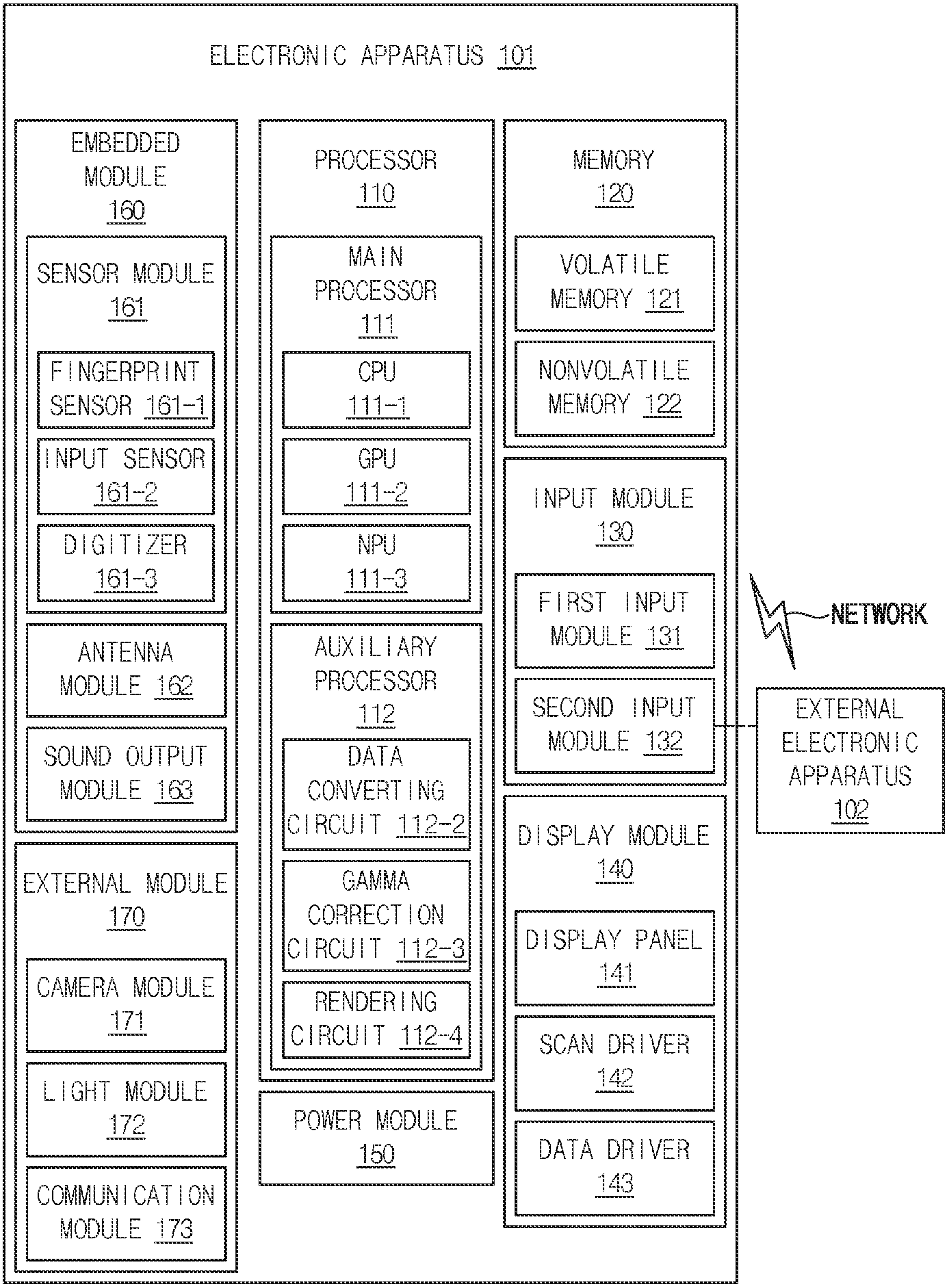
FIG. 20 is a block diagram illustrating an electronic apparatus according to an embodiment of the present invention.

FIG. 20 is a block diagram illustrating an electronic apparatus 101 according to an embodiment of the present invention.

Referring to FIGS. 1 to 20, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. In an embodiment, for example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g., a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added.

According to an embodiment, some of the above-described elements (e.g., the sensor module 161, an antenna module 162 or the sound output module 163) may be integrated into another element (e.g., the display module 140).

The processor 110 may execute software to control at least one other element (e.g., hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit ("GPU") 111-2, a communication processor ("CP") and an image signal processor ("ISP"). The main processor 111 may further include a neural processing unit ("NPU") 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network ("DNN"), a convolutional neural network ("CNN"), a recurrent neural network ("RNN"), a restricted boltzmann machine ("RBM"), a deep belief network ("DBN"), a bidirectional recurrent deep neural network ("BRDNN") and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g., a single chip) or each may be implemented as independent elements (e.g., in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g., the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g., the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g., the processor 110, the sensor module 161 or the sound output module 163) of the electronic apparatus 101 from the outside of the electronic apparatus 101 (e.g., the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g., a button) or a pen (e.g., a passive pen or an active pen). The second input module 132 may support a designated protocol capable of connecting to the external electronic apparatus 102 by wire or wirelessly. According to an embodiment, the second input module 132 may include a high definition multimedia interface ("HDMI"), a universal serial bus ("USB") interface, an SD card interface or an audio interface. The second input module 132 may include a connector physically connected to the external electronic apparatus 102, for example, an HDMI connector, a USB connector, an SD card connector, or an audio connector (e.g., a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. In an embodiment, for example, the scan driver 142 may include an amorphous silicon TFT gate driver circuit ("ASG") integrated on the display panel 141, a low temperature polycrystalline silicon ("LTPS") TFT gate driver circuit integrated on the display panel 141, or an oxide semiconductor TFT gate driver circuit ("OSG") integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g., the data voltage) and output the data voltages to the display panel 141 in response to the control signal.

The data driver 143 may be integrated into another element (e.g., the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit ("PMIC"). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure bio signals such as a blood pressure, a moisture, or a body fat. For example, when a user touches a part of his body to a sensor layer or a sensing panel and does not move for a certain period of time, the input sensor 161-2 may detect the bio signal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present invention may not be limited to a position of the sensing panel.

At least one of the fingerprint sensor 161-1, the input sensor 161-2 and the digitizer 161-3 may be embedded in the display panel 141. In an embodiment, for example, at least one of the fingerprint sensor 161-1, the input sensor 161-2 and the digitizer 161-3 is formed simultaneously with the display panel 141 through a process of forming elements included in the display panel 141 (e.g., light emitting elements, transistors, etc.).

In addition, the sensor module 161 may generate an electrical signal or a data value corresponding to an internal state or an external state of the electronic apparatus 101. In an embodiment, for example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g., the display panel 141) or the input sensor 161-2.

The sound output module 163 is a device for outputting sound signals to the outside of the electronic apparatus 101. In an embodiment, for example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system ("GNSS") communication module and a wired communication module such as a local area network ("LAN") communication module, or a power line communication module. The communication module 173 may communicate with the external electronic apparatus 102 through a short-range communication network such as Bluetooth, WiFi direct or infrared data association ("IrDA") or a long-distance communication network such as a cellular network, the Internet, or a computer network (e.g., LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. In an embodiment, for example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. In an embodiment, for example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. In an embodiment, for example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output ("GPIO"), a serial peripheral interface ("SPI"), a mobile industry processor interface ("MIPI"), or an ultra path interconnect ("UPI") link to exchange signals (e.g., commands or data) with each other. The processor 110 may communicate with the display module 140 through an agreed interface. In an embodiment, for example, the processor 110 may communicate with the display module 140 through any one of the above communication methods. The present invention may not be limited to the above communication methods.

The electronic apparatus 101 according to various embodiments disclosed in the disclosure may be various types of apparatuses. In an embodiment, for example, the electronic apparatus 101 may include at least one of a portable communication apparatus (e.g., a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

In an embodiment, for example, the display panel 100 of FIG. 1 may correspond to the display panel 141 of FIG. 20. For example, the driving controller 200 of FIG. 1 may correspond to the controller of the auxiliary processor 112 of FIG. 20. In an embodiment, for example, the gate driver 300 of FIG. 1 may correspond to the scan driver 142 of FIG. 20. For example, the data driver 500 of FIG. 1 may correspond to the data driver 143 of FIG. 20.

For example, the power voltage generator 600 of FIG. 1 may correspond to the power module 150 of FIG. 20.

According to the embodiments of the display apparatus in the present invention, the constant current of the gamma reference voltage generator and the data driver may be reduced so that the power consumption of the display apparatus may be effectively reduced.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display apparatus comprising:

a gamma reference voltage generator configured to generate a gamma reference voltage;

a digital-to-analog converter configured to convert a data signal to a data voltage based on the gamma reference voltage;

an amplifier configured to receive the data voltage from the digital-to-analog converter and to output the data voltage to a data line; and a bias voltage applier configured to output a first bias voltage to the gamma reference voltage generator and to output a second bias voltage to the amplifier, wherein the bias voltage applier is turned off and does not supply the first bias voltage to the gamma reference voltage generator and the second bias voltage to the amplifier while input image data have a black image.

2. The display apparatus of claim 1, wherein the gamma reference voltage generator and the amplifier are turned off while the input image data have the black image.

3. The display apparatus of claim 1, further comprising:

a channel connected to the data line;

a first switch connected between an output terminal of the amplifier and the channel; and a second switch connected between an input terminal of a hold voltage and the channel.

4. The display apparatus of claim 3, wherein, in a normal mode in which the input image data include a grayscale value which is not the black image, the first switch is turned on and the second switch is turned off.

5. The display apparatus of claim 4, wherein, in a black mode in which the input image data include only the black image, the first switch is turned off and the second switch is turned on.

6. The display apparatus of claim 3, wherein the hold voltage is a high data power voltage generated by a power voltage generator.

7. A display apparatus comprising:

a display panel including a data line extending in a second direction;

a channel connected to the data line;

an amplifier configured to output a data voltage;

a first switch connected between an output terminal of the amplifier and the channel; and a second switch connected between an input terminal of a hold voltage and the channel, wherein when input image data have a first black pattern extending in a first direction perpendicular to the second direction, the first switch is turned off and the second switch is turned on such that the input terminal of the hold voltage supplies the hold voltage, which is a predetermined direct current (DC) voltage, to the date line through the channel during a black period corresponding to the first black pattern, and the first switch is turned on and the second switch is turned off during a normal period not corresponding to the first black pattern.

8. The display apparatus of claim 7, wherein a data signal includes a line configuration and line data, and wherein the line configuration includes a setting signal representing the black period and the normal period.

9. The display apparatus of claim 8, wherein, when proceeding from the black period to the normal period, the setting signal is determined based on a wakeup time.

10. The display apparatus of claim 7, further comprising:

a gamma reference voltage generator configured to generate a gamma reference voltage;

a digital-to-analog converter configured to convert a data signal to the data voltage based on the gamma reference voltage; and a bias voltage applier configured to output a first bias voltage to the gamma reference voltage generator and to output a second bias voltage to the amplifier.

11. The display apparatus of claim 10, wherein the bias voltage applier is turned off during the black period.

12. The display apparatus of claim 11, wherein the gamma reference voltage generator and the amplifier are turned off during the black period.

13. A display apparatus comprising:

a display panel including a first display block and a second display block, which extend in an extension direction of a data line, wherein the data line includes a first data line and a second data line;

a first channel connected to the first data line of the first display block;

a first amplifier configured to output a first data voltage to the first channel;

A-1 switch connected between an output terminal of the first amplifier and the first channel;

B-1 switch connected between an input terminal of a hold voltage and the first channel;

a second channel connected to the second data line of the second display block;

a second amplifier configured to output a second data voltage to the second channel;

A-2 switch connected between an output terminal of the second amplifier and the second channel; and B-2 switch connected between an input terminal of the hold voltage and the second channel, wherein the A-1 switch and the B-1 switch are controlled independently from the A-2 switch and the B-2 switch, wherein the input terminal of the hold voltage supplies the hold voltage, which is a predetermined direct current (DC) voltage, to the first data line through the first channel when the B-1 switch is turned on and to the second data line through the second channel when the B-2 switch is turned on.

14. The display apparatus of claim 13, wherein, when the data line extends in a second direction, input image data have a second black pattern extending in the second direction and the second black pattern overlaps an entirety of the first display block, the A-1 switch is turned off and the B-1 switch is turned on.

15. The display apparatus of claim 13, wherein, when the data line extends in a second direction, input image data have a second black pattern extending in the second direction and the second black pattern partially overlaps the first display block or does not overlap the first display block, the A-1 switch is turned on and the B-1 switch is turned off.

16. The display apparatus of claim 13, wherein, when the data line extends in a second direction, input image data have a second black pattern extending in the second direction, the second black pattern overlaps an entirety of the first display block and the second black pattern partially overlaps the second display block or does not overlap the second display block, the A-1 switch is turned off, the B-1 switch is turned on, the A-2 switch is turned on and the B-2 switch is turned off.

17. The display apparatus of claim 13, wherein, when the data line extends in a second direction, input image data have a third black pattern extending in a first direction perpendicular to the second direction in the first display block, the A-1 switch is turned off and the B-1 switch is turned on during a black period corresponding to the third black pattern and the A-1 switch is turned on and the B-1 switch is turned off during a normal period not corresponding to the third black pattern.

18. The display apparatus of claim 17, wherein a data signal includes a line configuration and line data, wherein the line configuration includes a first display block setting signal representing the black period of the first display block and the normal period of the first display block and a second display block setting signal representing the black period of the second display block and the normal period of the second display block.

19. The display apparatus of claim 13, further comprising:

a gamma reference voltage generator configured to generate a gamma reference voltage;

a digital-to-analog converter configured to convert a data signal to a data voltage based on the gamma reference voltage; and a bias voltage applier configured to output a first bias voltage to the gamma reference voltage generator and to output a second bias voltage to the first amplifier and the second amplifier, wherein the data voltage includes the first data voltage and the second data voltage.

20. The display apparatus of claim 19, wherein while input image data have a black image for all display blocks in the display panel, the bias voltage applier is turned off.

* * * * *